United States Patent
Cho et al.

(10) Patent No.: US 8,737,101 B2
(45) Date of Patent: May 27, 2014

(54) SWITCH DRIVING CIRCUIT AND SWITCH DRIVING METHOD

(75) Inventors: Gye-Hyun Cho, Bucheon (KR); In-Kuk Baek, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 467 days.

(21) Appl. No.: 13/031,878

(22) Filed: Feb. 22, 2011

(65) Prior Publication Data

US 2011/0291624 A1  Dec. 1, 2011

(30) Foreign Application Priority Data

Feb. 24, 2010  (KR) .......................... 10-2010-0016766

(51) Int. Cl.
  *H02M 7/539* (2006.01)
(52) U.S. Cl.
  USPC ............................ 363/97; 363/56.04; 363/131
(58) Field of Classification Search
  USPC ............ 323/271, 282, 285; 363/21.02, 21.03, 363/56.04, 97, 98, 131, 132; 315/224, 226
  See application file for complete search history.

(56) References Cited

U.S. PATENT DOCUMENTS

| | | | |
|---|---|---|---|
| 6,535,402 B1 * | 3/2003 | Ying et al. | 363/41 |
| 6,614,208 B2 * | 9/2003 | Narita | 323/283 |
| 7,323,825 B2 | 1/2008 | Hwang et al. | |
| 7,408,307 B2 | 8/2008 | Ribarich | |
| 7,436,160 B2 | 10/2008 | Rusu et al. | |
| 7,683,594 B2 * | 3/2010 | Kim et al. | 323/282 |
| 2010/0181306 A1 * | 7/2010 | Gutierrez et al. | 219/660 |

* cited by examiner

*Primary Examiner* — Adolf Berhane
*Assistant Examiner* — Fred E Finch, III
(74) *Attorney, Agent, or Firm* — Okamoto & Benedicto LLP

(57) ABSTRACT

The present invention relates to a switch driving circuit and a driving method thereof that are capable of preventing hard switching. The present invention includes: a dead time controller generating an high-side switching driver controlling signal and a low-side switching driver controlling signal controlling the switching operation of the high-side switch and the low-side switch according to a dead time controlling signal; and a phase detector detecting a phase of a resonance current flowing into the second power voltage terminal to generate a phase information signal, wherein one of the high-side switch driver controlling signal and a signal corresponding thereto, and the phase information signal are compared, and if the turn-on time of the high-side switch is later than the phase change of the resonance current, the dead time is controlled for the turn-on time of the high-side switch to advance the phase change of the resonance current.

21 Claims, 5 Drawing Sheets

SWITCH DRIVING CIRCUIT AND SWITCH DRIVING METHOD

CROSS-REFERENCE TO RELATED APPLICATION

This application claims priority to and the benefit of Korean Patent Application No. 10-2010-0016766 filed in the Korean Intellectual Property Office on Feb. 24, 2010, the entire contents of which are incorporated herein by reference.

BACKGROUND OF THE INVENTION (a) Field of the Invention

The present invention relates to a switch driving circuit and a switch driving method.

(b) Description of the Related Art

FIG. 1 is a schematic view of a circuit generating AC power through a switching operation of a conventional switch and supplying it to a load. An high-side switch Q11 and a low-side switch Q12 shown in FIG. 1 include an n-channel MOSFET. The drain electrode of the high-side switch Q11 is input with a predetermined power voltage Vdc, and the gate electrode is input with a gate signal HO. The drain electrode of the low-side switch Q12 is connected to a source electrode of the high-side switch Q11, and the source electrode is input with a ground voltage. The gate electrode of the low-side switch Q12 is input with the gate signal LO. The high-side switch Q11 and the low-side switch Q12 include body diodes D1 and D2, and the node of the source electrode of the high-side switch Q11 and the drain electrode of the low-side switch Q2 become an output terminal. An inductor L and the first resonance capacitor C1 are connected in series between the output terminal and the load Rx, and the second resonance capacitor C2 is connected to the load Rx in parallel. The inductor L and the first and second resonance capacitors C1 and C2 compose a resonance circuit along with the load Rx.

The above-described switch circuit is operated by a zero voltage switching control method. The zero voltage switching turns on the high-side switch Q11 and the low-side switch Q12 when the voltage difference between the drain electrode and the source electrode of the high-side switch Q11 and the low-side switch Q12 is about 0V, and thereby a conduction loss is decreased. However, when the resonance circuit is a capacitive load condition, the current of the inductor L is faster than the phase of the output voltage Vs. Thus, hard switching is generated. The hard switching means that the high-side switch Q1 (or the low-side switch Q12) is turned on when the voltage difference between the drain electrode and the source electrode of the high-side switch Q11 (or the low-side switch Q12) is high. Generally, if the hard switching is generated, the power loss of the switching element is increased, and the switching element is easily broken.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a switch driving circuit and a driving method thereof that are capable of preventing the hard switching.

A switching driving circuit according to the present invention controls a switching operation of an high-side switch connected between a first power voltage terminal and an output terminal, and a low-side switch connected between the output terminal and a second power voltage terminal. The switch driving circuit includes a dead time controller generating an high-side switching driver controlling signal and a low-side switching driver controlling signal controlling the switching operation of the high-side switch and the low-side switch according to a dead time controlling signal, and a phase detector detecting a phase of a resonance current flowing into the second power voltage terminal to generate a phase information signal. One of the high-side switch driver controlling signal and a signal corresponding thereto, and the phase information signal are compared, and if the turn-on time of the high-side switch is later than the phase change of the resonance current, the dead time is controlled for the turn-on time of the high-side switch to advance the phase change of the resonance current.

The switch driving circuit compares one of the low-side switch driver controlling signal and a signal corresponding thereto, and the phase information signal, and if the turn-on time of the low-side switch is later than the phase change of the resonance current, the dead time is controlled for the turn-on time of the low-side switch to advance the phase change of the resonance current. If the turn-on time of the high-side switch and the turn-on time of the low-side switch are respectively later than the corresponding phase change of the resonance current, the dead time is decreased.

The switch driving circuit further includes a first state determiner receiving the phase information signal, the high-side switch driver controlling signal, and the low-side switch driver controlling signal input to compare the turn-on time of the high-side switch and the turn-on time of the low-side switch, and the corresponding phase changing time of the resonance current, and generating a first quasi-zero voltage switching signal to reduce the dead time if the turn-on time of the high-side switch and the turn-on time of the low-side switch are later than the corresponding phase changing time.

The switch driving circuit further includes a dead time controller controlling an operation of the dead time controller according to the first quasi-zero voltage switching signal, and the dead time controller generates the dead time controlling signal to reduce the dead time according to the first quasi-zero voltage switch signal when the turn-on time of the high-side switch and the turn-on time of the low-side switch are later than the corresponding phase changing time. The dead time is decreased if the dead time controlling signal is increased, and the dead time controlling signal generator includes a capacitor, a first source current source supplying the first source current source, and a first switch connected between the first source current source and the capacitor, and the first switch is turned on according to the first quasi-zero voltage switching signal.

The switch driving circuit compares the decreasing period of one of the output voltage output to the output terminal and the voltage corresponding to the output voltage, and the turn-on time of the low-side switch, and if the low-side switch is turned on before the decreasing of one of the output voltage and the voltage corresponding to the output voltage is completed, the dead time is controlled for the low-side switch to be turned on after the decreasing of one of the output voltage and the voltage corresponding to the output voltage is completed.

The switch driving circuit compares the increasing period of one of the output voltage and the voltage corresponding to the output voltage and the turn-on time of the high-side switch, and if the high-side switch is turned on before the increasing of the output voltage is completed, the dead time is controlled for the high-side switch to be turned on before the increasing of one of the output voltage and the voltage corresponding to the output voltage is completed.

The switch driving circuit further includes a edge detector detecting an increasing edge and a decreasing edge of one of the output voltage and the voltage corresponding to the output voltage, and generating a first pulse signal having a pulse during a period corresponding to the increasing edge of one of the output voltage and the voltage corresponding to the output voltage and the second pulse signal having a pulse during a period corresponding to the decreasing edge, wherein one of the low-side switch driver controlling signal and a signal corresponding thereto and the second pulse signal are compared, and if the turn-on time of the low-side switch advances the decreasing time of the second pulse signal, the dead time is controlled for the turn-on time of the low-side switch to be later than the decreasing time of the second pulse signal.

The switch driving circuit compares one of the high-side switch driver controlling signal and a signal corresponding thereto and the first pulse signal, and if the turn-on time of the high-side switch advances the decreasing time of the first pulse signal, the dead time is controlled for the turn-on time of the high-side switch to be later than the decreasing time of the first pulse signal.

The switch driving circuit further includes a second state determiner receiving the low-side switch driver controlling signal, the high-side switch driver controlling signal, the first pulse, and the second pulse, and if the turn-on time of the high-side switch advances the decreasing time of the first pulse signal under the comparing of the turn-on time of the high-side switch and the decreasing time of the first pulse signal, or the turn-on time of the low-side switch advances the decreasing time of the second pulse signal under the comparing of the turn-on time of the low-side switch and the decreasing time of the second pulse signal, generating a second quasi-zero voltage switching signal controlling the dead time controlling signal generator to increase the dead time.

The switch driving circuit further includes a dead time controller controlling the operation of the dead time controller according to the second quasi-zero voltage switching signal, and the dead time controller generates the dead time controlling signal to increase the dead time according to the second quasi-zero voltage switching signal when the turn-on time of the high-side switch advances the decreasing time of the first pulse signal under the comparing of the turn-on time of the high-side switch and the decreasing time of the first pulse signal, or when the turn-on time of the low-side switch advances the decreasing time of the second pulse signal under the comparing of the turn-on time of the low-side switch and the decreasing time of the second pulse signal.

The dead time is increased if the dead time controlling signal is decreased, and the dead time controlling signal generator includes a capacitor, a first switch connected to one terminal of the capacitor and switch-operated according to the second quasi-zero voltage switching signal, and a first sink current connected to the other terminal of the first switch and generating a sink current.

The switch driving circuit compares one of the low-side switch driver controlling signal and a signal corresponding thereto and the phase information signal, and if the turn-on time of the low-side switch is later than the phase change of the resonance current, the dead time is controlled for the turn-on time of the low-side switch to advance the phase change of the resonance current.

The dead time is decreased if the turn-on time of the high-side switch and the turn-on time of the low-side switch are later than the phase change of the resonance current.

The dead time controlling signal generator includes: a capacitor; a first source current source having one terminal supplied with a power voltage; a first sink current having one terminal that is grounded; a first switch connected between one terminal of the capacitor and the other terminal of the first source current source, and executing a switching operation according to the first quasi-zero voltage switching signal; and a second switch connected between one terminal of the capacitor and the other terminal of the first sink current, and executing the switching operation according to the second quasi-zero voltage switching signal.

The voltage corresponding to the output voltage operates an high-side switch driver generating a gate signal of the high-side switch.

A method for driving a switch driving circuit controls a switching operation of an high-side switch connected between the first power voltage terminal and an output terminal, and a low-side switch connected between the output terminal and the second power voltage terminal. The switch driving method includes detecting a phase of a resonance current flowing in the second power voltage terminal, comparing the turn-on time of the high-side switch and a phase changing time of the resonance current, and controlling the dead time for the turn-on time of the high-side switch to advance a phase change of the resonance current if the turn-on time of the high-side switch is later than the phase change of the resonance current as the comparison result.

The controlling of the dead time includes controlling the dead time for the turn-on time of the low-side switch to advance the phase change of the resonance current if the turn-on time of the low-side switch is later than the phase change of the resonance current.

The method further includes comparing a decreasing period of one of the output voltage output to the output terminal and the voltage corresponding to the output voltage, and the turn-on time of the low-side switch, and the controlling of the dead time includes controlling the dead time for the low-side switch to be turned on after the decreasing of one of the output voltage and the voltage corresponding to the output voltage is completed if the low-side switch is turned on before the decreasing of one of the output voltage and the voltage corresponding to the output voltage is completed as the comparison result.

The method further includes comparing the increasing period of one of the output voltage output to the output terminal and the voltage corresponding to the output voltage, and the turn-on time of the high-side switch, and the controlling of the dead time further includes controlling the dead time for the high-side switch to be turned on after the increasing of one of the output voltage and the voltage of the voltage corresponding to the output voltage is completed if the high-side switch is turned on before the increasing of the output voltage is completed.

As described above, according to the present invention, the damage to the switching element due to the hard switching may be prevented.

DETAILED DESCRIPTION OF THE EMBODIMENTS

Figure 1:
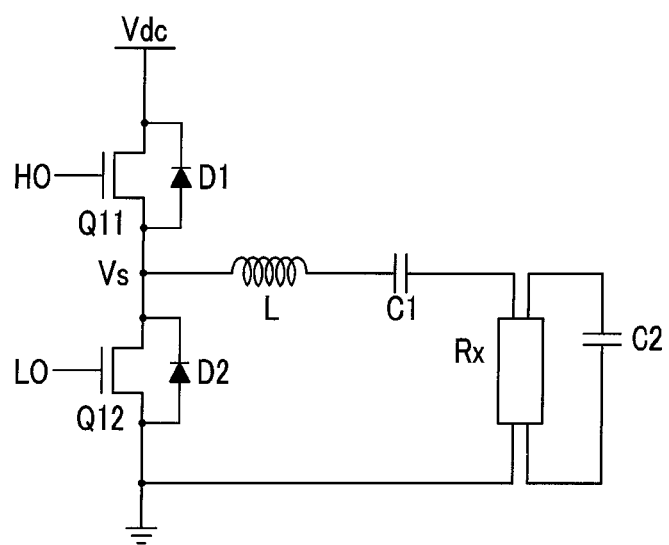
FIG. 1 is a schematic view of a circuit generating AC power through a switching operation of a conventional switch and supplying it to a load.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 2:
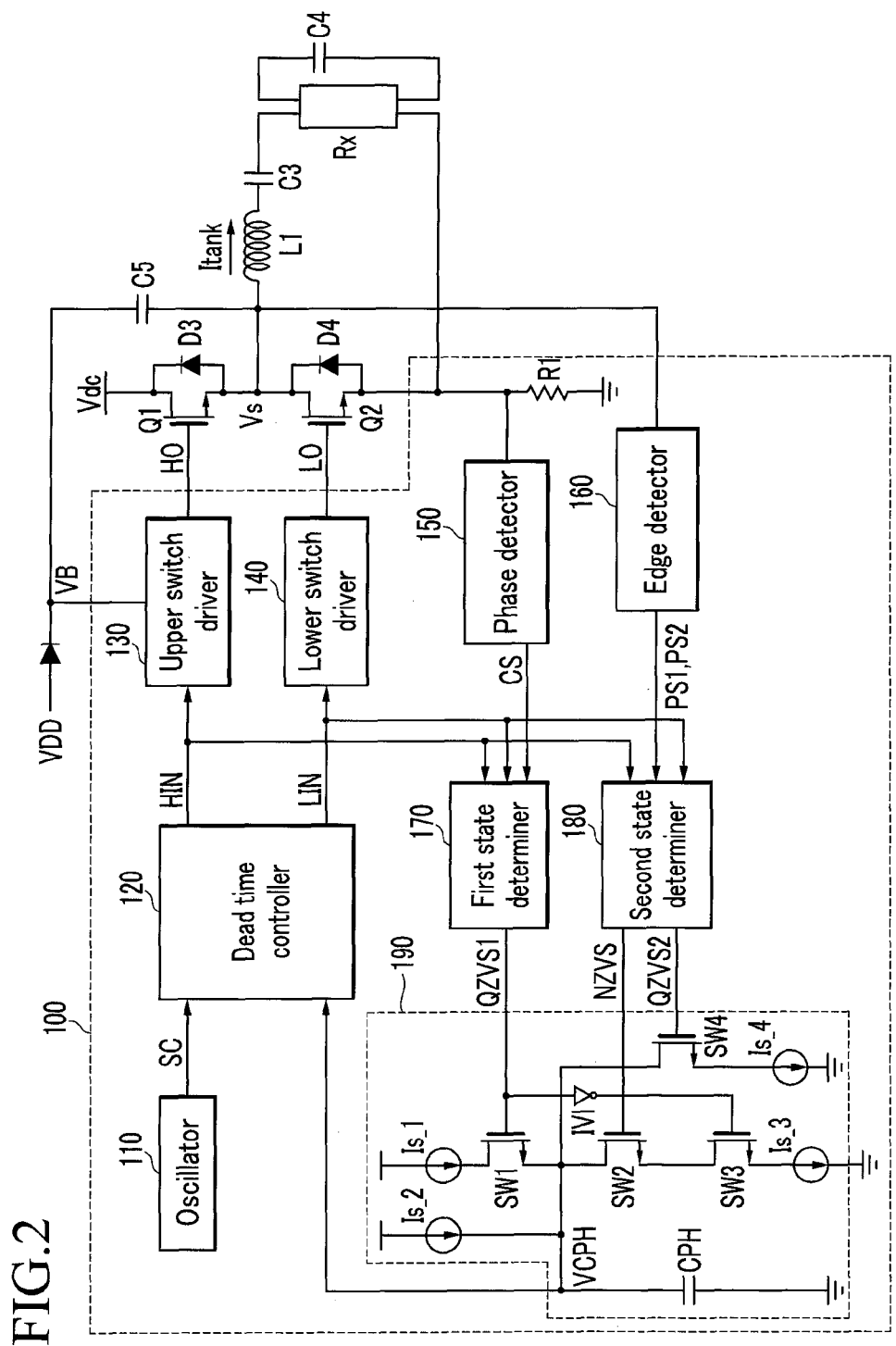
FIG. 2 shows a switch driving circuit according to an exemplary embodiment of the present invention.
Figure 3:
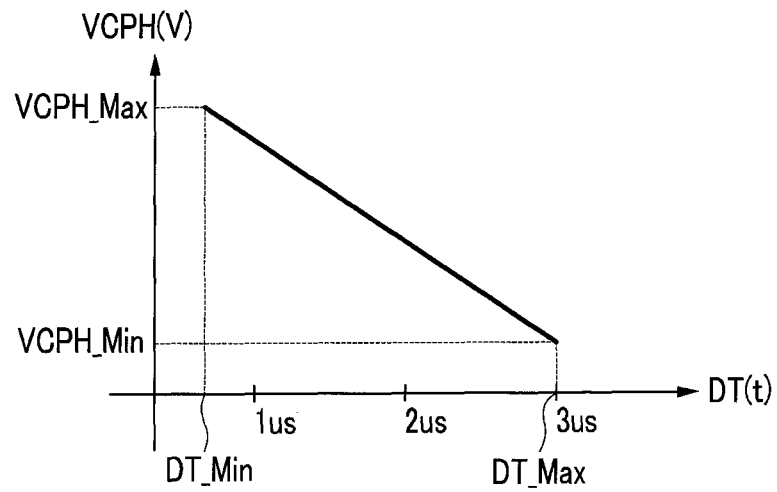
FIG. 3 is a view showing a dead time controlling signal VCPH and a dead time DT.

FIG. 2 is a switch driving circuit according to an exemplary embodiment of the present invention, and FIG. 3 is a view showing a dead time controlling signal VCPH and a dead time DT.

An high-side switch Q1 and a low-side switch Q2 shown in FIG. 2 are realized by using a MOSFET (metal oxide semiconductor field effect transistor), BJT (bipolar junction transistor), or IGBT (insulated gate bipolar transistor), and include body diodes D3 and D4. The high-side switch Q1 and the low-side switch Q2 according to an exemplary embodiment of the present invention are realized by using the MOSFET, BJT, or IGBT of the n-channel type. Accordingly, when the gate signal HO and LO are the high level, they are turned on, and if they are the low level, they are turned off. The node at which the source electrode of the high-side switch Q1 and the drain electrode of the low-side switch Q2 meet each other becomes an output terminal. An inductor L1 between the output terminal and the load Rx and the first resonance capacitor C3 are connected in series, and the second resonance capacitor C4 and the load Rx are connected in parallel.

Referring to FIG. 2, a switch driving circuit 100 according to the present invention includes an oscillator 110, a dead time controller 120, an high-side switch driver 130, a low-side switch driver 140, a resistor R1, a phase detector 150, an edge detector 160, a first state determiner 170, a second state determiner 180, and a dead time controlling signal generator 190.

The oscillator 110 generates a switching controlling signal SC to control the switching operation of the high-side switch Q1 and the low-side switch Q2. The switching frequency of the high-side switch Q1 and the low-side switch Q2 is determined according to the switching controlling signal SC.

The dead time controller 120 generates an high-side switch driver controlling signal HIN and a low-side switch driver controlling signal LIN according to the switching controlling signal SC and the dead time controlling signal VCPH. The dead time controller 120 generates the high-side switch driver controlling signal HIN generating the gate signal HO of the high level after the dead time DT corresponding to the dead time controlling signal VCPH from the time when the switching controlling signal SC ascends from the low level to the high level.

Also, the dead time controller 120 generates the low-side switch driver controlling signal LIN generating the gate signal LO of the high level after the dead time DT corresponding to the dead time controlling signal VCPH from the time when the switching controlling signal SC decends from the high level to the low level.

As shown in FIG. 3, the dead time controller 120 decreases the dead time DT if the magnitude of the dead time controlling signal VCPH is increased, and if the magnitude of the dead time controlling signal VCPH is decreased, it increases the dead time DT. Accordingly, when the dead time controlling signal VCPH is a maximum value VCPH_Max, the dead time DT becomes a minimum time DT_Min, and when the dead time controlling signal VCPH is a minimum value VCPH_Min, the dead time DT is the maximum time DT_Max.

The high-side switch driver 130 generates a gate signal HO to control the switching operation of the high-side switch Q1 according to the high-side switch driver controlling signal HIN. The low-side switch driver 140 generates a gate signal LO to control the switching operation of the low-side switch Q2 according to the low-side switch driver controlling signal LIN. One terminal of the resistor R1 is connected to the source electrode of the low-side switch Q2, and the other terminal is connected to the ground voltage terminal.

The phase detector 150 is connected to the source electrode of the low-side switch Q2 and one terminal of the resistor R1 thereby detecting the phase of the resonance current Itank flowing in the inductor L1 such that a phase information signal CS is generated. The phase detector 150 detects the time that the polarity of the resonance current Itank is changed, that is, the time that the polarity is changed from "−" to "+" (or from "+" to "−"), thereby generating the phase information signal CS. Hereafter, the direction that the resonance current (tank flows from the inductor L1 to the load Rx is defined as a "+" direction, and the direction that it flows from the load Rx to the inductor L1 is defined as a "−" direction.

The edge detector 160 is connected to the output terminal, thereby generating the first pulse signal PS1 at the time when the output voltage Vs output from the output terminal ascends from the low level to the high level, and generating the second pulse signal PS2 at the time when the output voltage Vs descends from the high level to the low level.

The first pulse signal PS1 is in synchronization with the increasing time of the output voltage Vs thereby being the high level, and becomes a predetermined short pulse during a time corresponding to the increasing edge period of the output voltage Vs. The second pulse signal PS2 is in synchronization with the decreasing time of the output voltage Vs thereby being the high level, and becomes a predetermined short pulse during a time corresponding to the decreasing edge period of the output voltage Vs.

The first state determiner 170 receives the high-side switch driver controlling signal HIN, the low-side switch driver controlling signal LIN, and the phase information signal CS to determine the switching state, thereby generating the first quasi-zero voltage switching signal QZVS1.

The first state determiner 170 respectively compares the increasing time of the high-side switch driver controlling signal HIN and the increasing time of the low-side switch driver controlling signal LIN with the generating time of the phase information signal CS. As the comparison result, if the generating time of the phase information signal CS precedes the increasing time of the high-side switch driver controlling signal HIN, the first state determiner 170 determines it as the hard switching state thereby generating the first quasi-zero voltage switching signal QZVS1 as the high level for the dead time DT to be reduced. As the comparison result, if the generating time of the phase information signal CS precedes the increasing time of the low-side switch driver controlling signal LIN, the first state determiner 170 determines it as the hard switching state thereby generating the first quasi-zero voltage switching signal QZVS1 as the high level for the dead time DT to be reduced.

The switch driving device according to an exemplary embodiment of the present invention reduces the dead time such that the turn-on times of the high-side switch Q1 and the low-side switch Q2 of the cycle following the cycle in which the first quasi-zero voltage switching signal reducing the dead time is generated are advanced. Thus, the turn-on times of the high-side switch Q1 and the low-side switch Q2 of the next cycle of the switching period in which the hard switch state is determined are also advanced.

When the dead time DT is decreased, each of the turn-on times of the high-side switch Q1 and the low-side switch Q2 advances a generating time of a corresponding phase information signal CS. That is, each of the turn-on times of the high-side switch Q1 and the low-side switch Q2 advances a corresponding phase changing time of the resonance current Itank.

That is, the high-side switch Q1 is turned on at the "−" phase in which the resonance current Itank flows from the load Rx to the inductor L1. The resonance current Itank is free-wheeled in the "−" phase through the body diode D3 such that the voltage between both terminals of the high-side switch Q1, that is, the drain-source voltage, is a voltage close to the zero voltage, and thereby the high-side switch Q1 has the zero voltage switching operation.

Also, the low-side switch Q2 is turned on at the "+" phase of the resonance current Itank. When the resonance current Itank is the "+" phase, it is free-wheeled through the body diode D4 such that the voltage of both terminals of the low-side switch Q2, that is, the drain-source voltage, is the voltage close to the zero voltage, and thereby the low-side switch Q2 has the zero voltage switching operation.

The second state determiner 180 receives the high-side switching driver controlling signal HIN, the low-side switching driver controlling signal LIN, and the first and second pulse signals PS1 and PS2 to determine the switching state, thereby generating the normal zero voltage switching signal NZVS and the second quasi-zero voltage switching signal QZVS2. The second state determiner 180 compares the decreasing time of the first pulse signal PS1 and the increasing time of the high-side switching driver controlling signal HIN.

As the comparison result, if the increasing time of the high-side switch driver controlling signal HIN advances the decreasing time of the first pulse signal PS1, the second state determiner 180 is determined as the hard switching such that the second quasi-zero voltage switching signal QZVS2 is generated as the high level for the dead time DT to be increased. That is, if the high-side switch is turned on under the increasing edge period of the output voltage Vs, it is determined that the hard switching having the large difference of both terminals of the high-side switch is generated. Here, the dead time is increased to delay the turn-on time of the high-side switch.

Likewise, the second state determiner 180 compares the decreasing time of the second pulse signal PS2 and the increasing time of the low-side switching driver controlling signal LIN. As the comparison result, if the increasing time of the low-side switch driver controlling signal LIN advances the decreasing time of the second pulse signal PS2, the second state determiner 180 is determined as the hard switching state such that the second quasi-zero voltage switching signal QZVS2 is generated as the high level for the dead time DT to be increased. That is, if the low-side switch is turned on under the decreasing edge period of the output voltage, it is determined that the hard switching having the large difference of both terminals of the low-side switch is generated. Here, the dead time is increased to delay the turn-on time of the low-side switch.

The dead time controlling signal generator 190 receives the first and second quasi-zero voltage switching signals QZVS1 and QZVS2 and the normal zero voltage switching signal NZVS to generate the dead time controlling signal VCPH.

The dead time controlling signal generator 190 includes the first and second source current sources Is_1 and Is_2, the first and second sink current sources Is_3 and Is_4, the first to fourth switches SW1-SW4, an inverter IV1, and a capacitor CPH. The first to fourth switches SW1-SW4 according to an exemplary embodiment of the present invention include the n-channel MOSFET.

One terminal of the first source current source Is_1 is connected to the power voltage Vdc terminal, and the other terminal is connected to the drain electrode of the first switch SW1. One terminal of the second source current source Is_2 is connected to the power voltage Vdc terminal, and the other terminal is connected to the source electrode of the first switch SW1.

One terminal of the first sink current source Is_3 is connected to the source electrode of the third switch SW3, and the other terminal is connected to the ground voltage terminal. One terminal of the second sink current source Is_4 is connected to the source electrode of the fourth switch SW4, and the other terminal is connected to the ground voltage terminal.

The source electrode of the first switch SW1 is connected to the drain electrode of the second switch SW2, and the gate electrode receives the first quasi-zero voltage switching signal QZVS1. The source electrode of the second switch SW2 is connected to the drain electrode of the third switch SW3, and the gate electrode receives the normal zero voltage switching signal NZVS. The gate electrode of the third switch SW3 receives the output of the inverter IV1, the drain electrode of the fourth switch SW4 is connected to the source electrode of the first switch SW1, and the gate electrode receives the second quasi-zero voltage switching signal QZVS2.

The inverter IV1 inverts and outputs the first quasi-zero voltage switching signal QZVS1. One terminal of the capacitor CPH is connected to the source electrode of the first switch SW1, and the other terminal is connected to the ground voltage terminal. The capacitor CPH is used as a compensation capacitor to control the dead time. The voltage of both terminals of the capacitor CPH is generated as the dead time controlling signal VCPH.

Figure 4:
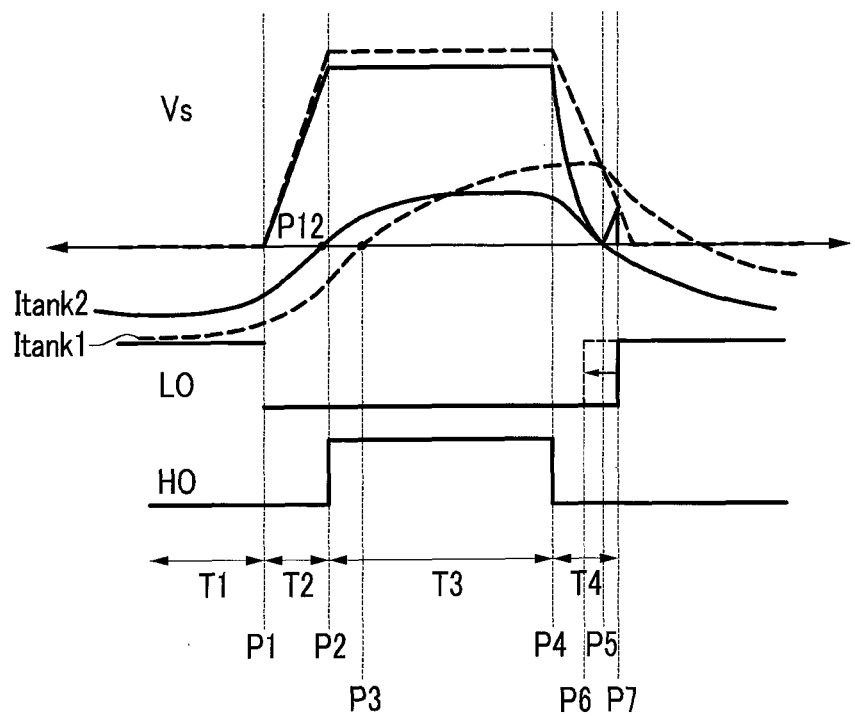
FIG. 4 is a waveform diagram to explain an operation of the first state determiner 170 shown in FIG. 2.

That is, if the voltage of the capacitor CPH is increased, the magnitude of the dead time controlling signal VCPH is increased such that the dead time DT is reduced, and if the voltage of the capacitor CPH is discharged, the magnitude of the dead time controlling signal VCPH is reduced such that the dead time DT is increased. This will be described in detail, FIG. 4 is a waveform diagram to explain the operation of the first state determiner 170 shown in FIG. 2, and showing an output voltage Vs, resonance currents Itank1 and Itank2, and gate signals HO and LO. The resonance current Itank1 indicated by the dotted line in FIG. 4 is a resonance current generated under the normal zero voltage switching state, and the resonance current Itank2 indicated by the solid line is a resonance current generated under the hard switching state.

Firstly, referring to the resonance current Itank1, the operation of the switch driving circuit under the normal zero voltage switching state will be described.

Referring to FIG. 4, the low-side switch Q2 is turned-on by the gate signal LO during the section T1. If the low-side switch Q2 is turned-on, the resonance current Itank1 flowing in the inductor L1 flows into the ground voltage terminal ("−" direction) through the low-side switch Q2.

A section T2 as a freewheeling section of the resonance current Itank is the dead time section between the turn-off time of the low-side switch Q2 and the turn-on time of the high-side switch Q1. If the gate signal LO is changed from the high level to the low level at the time P1, the low-side switch Q2 is turned off. Here, the direction of the resonance current Itank1 is not changed such that the body diode D3 is connected, and the resonance current Itank is reduced while flowing through the body diode D3 from the load Rx (the "−" direction).

If the gate signal HO becomes the high level at the time P2 such that the high-side switch Q1 is turned on, the resonance current Itank1 flows through the high-side switch Q1.

The section T3 is the turn-on period of the upper gate Q1 after the dead time T2 is finished. After the time P3, the resonance current Itank1 flows through the high-side switch Q1 in the direction of the load Rx.

The phase detector 150 detects the time that the polarity of the resonance current Itank1 is changed, that is, the time P3 when the polarity is changed from "−" to "+", to generate the phase information signal CS. If the resonance current Itank1 flows into the ground through the resistor R1 at the time P3, the positive voltage is generated in the resistor R1. The resonance current Itank1 is the current flowing in the ground, the resistor R1, the load Rx, and the inductor L1 before the time P3 such that the voltage generated in the resistor R1 is the negative voltage. The phase detector 150 may detect the phase of the resonance current Itank1 according to the voltage level of the resistor R1.

The first state determiner 170 compares the generating time P3 of the phase information signal CS and the changing time of the high-side switch driver controlling signal HIN, that is, the time P2 when the gate signal HO becomes the high level. In FIG. 4, the gate signal HO is the high level at the time P3 when the resonance current Itank1 is 0 such that the first state determiner 170 determines the zero voltage switching state, and thereby the first quasi-zero voltage switching signal QZVS1 is output as the low level.

However, according to the normal zero voltage switching operation, the resonance current Itank1 flows through the body diode D3 before the switching operation such that the switching loss may be reduced.

However, as shown in FIG. 4, in the case that the time when the phase of the resonance current Itank2 indicated by the solid line is changed, that is, the generating time P12 of the phase information signal CS advances the changing time of the high-side switch driver controlling signal HIN, when the time P2 when the gate signal HO becomes the high level, the hard switching is generated. In the case in which the phase changing time of the resonance current Itank2 is the same as the increasing time of the gate signal HO, the hard switching may also be generated. That is, to avoid the hard switching, it is preferable that the phase changing time of the resonance current advances the increasing time of the gate signal.

In detail, as the comparison result of the time P12 and the time P2, the phase changing time of the resonance current Itank2 advances the turn-on time of the high-side switch Q1 such that the first state determiner 170 determines the hard switching state. Thus, the first state determiner 170 outputs the first quasi-zero voltage switching signal QZVS1 as the high level. If the first quasi-zero voltage switching signal QZVS1 becomes the high level, the first switch SW1 is turned on and the third switch SW3 is turned off such that the capacitor CPH is charged by the source current source Is_1, and thereby the magnitude of the dead time controlling signal VCPH is increased.

The section T4 as the dead time between the time that the high-side switch Q1 is turned off and the time that the low-side switch Q2 is turned on is the free-wheel period of the resonance current Itank2.

If the gate signal HO is the low level at the time P4, the high-side switch Q1 is turned off. Here, it is the state that the direction of the resonance current Itank2 is not changed such that the resonance current Itank2 flows through the body diode D4 in the load ("+" direction), and is reduced. The reducing resonance current Itank2 becomes 0 at the time P5. After the time P5, the body diode D3 is connected such that the resonance current Itank2 flows from the load Rx ("−" direction) through the body diode D3. If the dead time is maintained as it is, as shown by the dotted line, the low-side switch Q2 is turned on at the time P7 such that the hard switching is operated. Thus, the voltage Vs has a peak that is rapidly increased by the hard switching, as shown in the periods P5-P7.

As the comparison result of the time P7 and the time P5, the phase changing time P5 of the resonance current Itank2 advances the turn-on time P7 of the low-side switch Q2 such that the first state determiner 170 determines the hard switching state. Thus, the first state determiner 170 outputs the first quasi-zero voltage switching signal QZVS1 as the high level. If the first quasi-zero voltage switching signal QZVS1 becomes the high level, the first switch SW1 is turned on such that the capacitor CPH is charged, and thereby the magnitude of the dead time controlling signal VCPH is increased.

The first quasi-zero voltage switching signal QZVS1 becomes the high level such that the magnitude of the dead time controlling signal VCPH is increased and the dead time is decreased.

For example, if the dead time is decreased such that the increasing time of the gate signal LO indicated by the dotted line of FIG. 4 is advanced, the switch Q2 is turned on at the time P6 earlier than the time P5 when the resonance current Itank2 is 0 such that the zero voltage switching operation may be executed. Thus, the waveform diagram of the voltage Vs is changed like the dotted line of FIG. 4 and does not include the peak.

FIG. 5A, 5B, 6A, and 6B are waveform diagrams to explain an operation of the second state determiner 180 shown in FIG. 2.

Figure 5A:
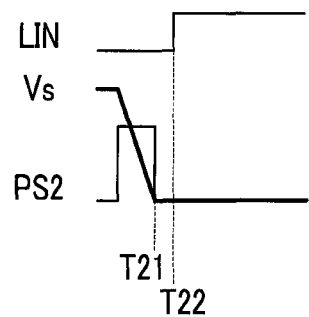
FIGS. 5A, 5B, 6A, and 6B are waveform diagrams to explain an operation of the second state determiner 180 shown in FIG. 2.

FIG. 5A shows a low-side switch driver controlling signal LIN, an output voltage Vs, and the second pulse signal PS2 in the case of the normal zero voltage switching operation.

Figure 5B:
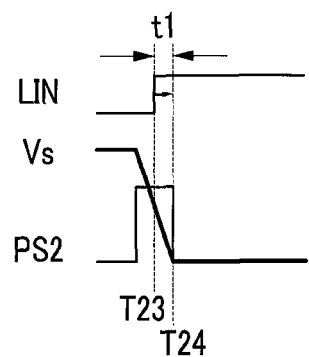

FIG. 5B shows the low-side switch driver controlling signal LIN, the output voltage Vs, and the second pulse signal PS2 in the case that the zero voltage switching operation has failed.

Figure 6A:
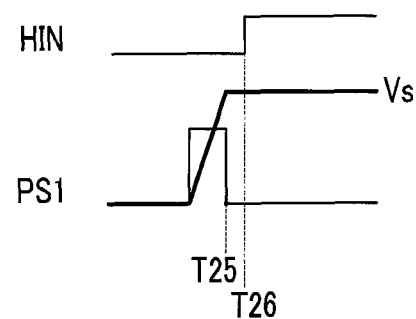

FIG. 6A shows the high-side switch driver controlling signal HIN, the output voltage Vs, and the first pulse signal PS1 in the case of the normal zero voltage switching operation.

Figure 6B:
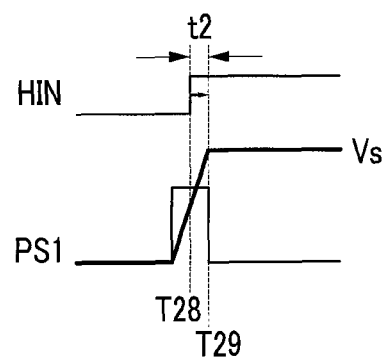

FIG. 6B shows the high-side switch driver controlling signal LIN, the output voltage Vs, and the first pulse signal PS1 in the case that the zero voltage switching operation has failed.

Referring to FIG. 5A, firstly, the edge detector 160 detects the decreasing edge of the output voltage Vs to generate the second pulse signal PS2 having the pulse during the decreasing edge period. If the second pulse signal PS2 is generated, the second state determiner 180 compares the increasing time T22 of the low-side switch driver controlling signal LIN and the decreasing time T21 of the second pulse signal PS2. As the comparison result, as shown in FIG. 5A, when the increasing time T22 of the low-side switch driver controlling signal LIN is next to the decreasing time T21 of the second pulse signal PS2, the normal zero voltage switching state is executed such that the first quasi-zero voltage switching signal QZVS1 is the low level, and the signal of the high level is transmitted to the gate electrode of the third switch SW3 through the inverter IV1 such that the second and third switches SW2 and SW3 are turned on. Here, it is set that the current magnitudes of the source current source Is_2 and the sink current source Is_3 are equal to each other such that the dead time controlling signal VCPH maintains the current state.

In contrast, as the comparison result, as shown in FIG. 5B, when the increasing time T23 of the low-side switch driver controlling signal LIN advances the decreasing time T24 of the second pulse signal PS2, the second state determiner 180 generates the second quasi-zero voltage switching signal QZVS2 as the high level. Thus, the fourth switch SW4 is turned-on such that the capacitor CPH is discharged. It is set that the current magnitude of the sink current source Is_4 is larger than the current magnitude of the source current source Is_2, and the fourth switch SW4 is turned on such that the capacitor CPH may be discharged.

If the magnitude of the dead time controlling signal VCPH is increased, the dead time DT is increased, and as a result, the increasing time of the low-side switching driver controlling signal LIN of the next cycle is delayed by at least a predetermined time t1. Accordingly, when the output voltage Vs is 0V, the low-side switch Q2 is turned on such that the zero voltage switching operation may be executed.

Referring to FIG. 6A, the edge detector 150 firstly detects the increasing edge of the output voltage Vs to generate the first pulse signal PS1 having the pulse during the increasing edge period. If the first pulse signal PS1 is generated, the second state determiner 180 compares the increasing time T26 of the high-side switch driver controlling signal HIN and the decreasing time T25 of the first pulse signal PS1. As the comparison result, as shown in FIG. 6A, when the decreasing time T25 of the first pulse signal PS1 advances the increasing time T26 of the high-side switch driver controlling signal HIN, the second state determiner 180 generates the normal zero voltage switching signal NZVS as the high level.

For the normal zero voltage switching state, the first quasi-zero voltage switching signal QZVS1 is the low level, and the signal of the high level is transmitted to the gate electrode of the third switch SW3 through the inverter IV1 such that the second and third switches SW2 and SW3 are turned on, and thereby the dead time controlling signal VCPH maintains the current state.

In contrast, as the comparison result, as shown in FIG. 6B, when the increasing time T23 of the high-side switch driver controlling signal HIN advances the decreasing time T29 of the first pulse signal PS1, the second state determiner 180 generates the second quasi-zero voltage switching signal QZVS2 as the high level. Thus, the fourth switch SW4 is turned on such that the capacitor CPH is discharged. It is set that the current magnitude of the sink current source Is_4 is larger than the current magnitude of the source current source Is_2, and the fourth switch SW4 is turned on such that the capacitor CPH may be discharged.

If the magnitude of the dead time controlling signal VCPH is decreased, the dead time DT is increased, as a result, the increasing time of the high-side switching driver controlling signal HIN of the next cycle is delayed by at least predetermined time t2. Accordingly, when the output voltage Vs is 0V, the high-side switch Q1 is turned on such that the zero voltage switching operation may be executed.

In FIG. 5A, 5B, 6A, and 6B, the case that the low-side switch Q1 and the high-side switch Q2 are turned on among the decreasing period and the increasing period of the output voltage has been described. However, in the case that the low-side switch Q2 is turned-on before the output voltage is decreased, or the high-side switch Q1 is turned on before the output voltage is increased, the dead time is also increased. That is, in the case that the low-side switch Q2 is turned on before the decreasing of the output voltage is completed, or the high-side switch Q1 is turned on before the increasing of the output voltage is completed, the dead time is increased.

In the above-described embodiments, the output voltage Vs is used to determine the existence of the zero voltage switching, however the driving voltage VB of the high-side switch driver 130 operating the high-side switch Q1 may be used. The output voltage Vs and the driving voltage VB are the voltage having the same phase and a similar magnitude. In this case, the edge detector 160 receives the voltage of the high-side switch driver 130 of the high-side switch Q1.

In addition, the high-side switch driver controlling signal HIN and the low-side switch driver controlling signal LIN are used to determine the existence of the zero voltage switching, however the gate signals HO and LO applied to the gate of the high-side switch Q1 and the low-side switch Q2 may be used instead of the high-side switch driver controlling signal HIN and the low-side switch driver controlling signal LIN. In this case, the increasing time of the gate signal HO of the high-side switch Q1 and the generating time of the phase information signal CS are compared. In addition, the second state determiner 180 compares the decreasing time of the first pulse signal PS1 and the increasing time of the upper gate signal HO, and compares the decreasing time of the second pulse signal PS2 and the increasing time of the low-side switch gate signal LO.

In addition, in an exemplary embodiment of the present invention, if the dead time controlling signal VCPH is increased, the dead time DT is decreased, and if the dead time controlling signal VCPH is decreased, the dead time DT is increased, however the present invention is not limited thereto. When the relationship between the dead time controlling signal VCPH and the dead time DT stored in the dead time controller 120 is opposite to the above-described exemplary embodiment, the dead time controlling signal generator 120 may increase the dead time controlling signal VCPH to increase the dead time DT, and may decrease the dead time controlling signal VCPH to decrease the dead time DT.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<DESCRIPTION OF SYMBOLS> body diode D3 and D4, high-side switch Q1, low-side switch Q2 first resonance capacitor C3, second resonance capacitor C4 oscillator 110, dead time controller 120, high-side switch driver 130 low-side switch driver 140, resistor R1, phase detector 150 edge detector 160, first state determiner 170, resonance current Itank second state determiner 180, dead time controlling signal generator 190 first pulse signal PS1, output voltage Vs, second pulse signal PS2 high-side switch driver controlling signal HIN
low-side switch driver controlling signal LIN
first quasi-zero voltage switching signal QZVS1
second quasi-zero voltage switching signal QZVS2,
first source current source Is_1, second source current source Is_2 phase information signal CS, first sink current source Is_3 second sink current source Is_4, first to fourth switch SW1-SW4 inverter IV1, capacitor CPH, first to fourth switch SW1-SW4 dead time controlling signal VCPH, dead time DT

What is claimed is:

1. A switching driving circuit controlling a switching operation of a high-side switch connected between a first power voltage terminal and an output terminal, and a low-side switch connected between the output terminal and a second power voltage terminal, comprising:
a dead time controller generating a high-side switching driver controlling signal and a low-side switching driver controlling signal controlling a switching operation of the high-side switch and the low-side switch according to a dead time controlling signal; and
a phase detector detecting a phase of a resonance current flowing into the second power voltage terminal to generate a phase information signal,
wherein one of the high-side switch driver controlling signal and a signal corresponding thereto, and the phase information signal are compared, and if a turn-on time of the high-side switch is later than a phase change of the resonance current, the dead time is controlled for the turn-on time of the high-side switch to advance the phase change of the resonance current.

2. The switch driving circuit of claim 1, wherein
one of the low-side switch driver controlling signal and a signal corresponding thereto, and the phase information signal are compared, and if a turn-on time of the low-side switch is later than the phase change of the resonance current, the dead time is controlled for the turn-on time of the low-side switch to advance the phase change of the resonance current.

3. The switch driving circuit of claim 2, wherein,
if the turn-on time of the high-side switch and the turn-on time of the low-side switch are respectively later than a corresponding phase changing time of the resonance current, the dead time is decreased.

4. The switch driving circuit of claim 3, further comprising:
a first state determiner receiving the phase information signal, the high-side switch driver controlling signal, and the low-side switch driver controlling signal to compare the turn-on time of the high-side switch, the turn-on time of the low-side switch, and the corresponding phase changing time of the resonance current, and generating a first quasi-zero voltage switching signal to reduce the dead time if the turn-on time of the high-side switch and the turn-on time of the low-side switch are later than the corresponding phase changing time of the resonance current.

5. The switch driving circuit of claim 4, further comprising:
a dead time controlling signal generator controlling an operation of the dead time controller according to the first quasi-zero voltage switching signal,
wherein the dead time controlling signal generator generates the dead time controlling signal to reduce the dead time according to the first quasi-zero voltage switch signal when the turn-on time of the high-side switch and the turn-on time of the low-side switch are later than the corresponding phase changing time of the resonance current.

6. The switch driving circuit of claim 5, wherein the dead time is decreased if the dead time controlling signal is increased, and the dead time controlling signal generator includes:
a capacitor;
a first source current source supplying a first source current; and
a first switch connected between the first source current source and the capacitor, wherein the first switch is turned on according to the first quasi-zero voltage switching signal.

7. A method for driving a switch driving circuit controlling a switching operation of a high-side switch connected between a first power voltage terminal and an output terminal, and a low-side switch connected between the output terminal and a second power voltage terminal, comprising:
detecting a phase of a resonance current flowing in the second power voltage terminal;
comparing a turn-on time of the high-side switch and a phase changing time of the resonance current; and
controlling a dead time for the turn-on time of the high-side switch to advance a phase change of the resonance current if the turn-on time of the high-side switch is later than the phase changing time of the resonance current.

8. The method of claim 7, wherein controlling the dead time includes controlling the dead time for the turn-on time of the low-side switch to advance the phase changing time of the resonance current if the turn-on time of the low-side switch is later than the phase change of the resonance current.

9. A switching driving circuit controlling a switching operation of a high-side switch connected between a first power voltage terminal and an output terminal, and a low-side switch connected between the output terminal and a second power voltage terminal, comprising:
a dead time controller generating a high-side switching driver controlling signal and a low-side switching driver controlling signal controlling the switching operation of the high-side switch and the low-side switch according to a dead time controlling signal; and
a phase detector detecting a phase of a resonance current flowing into the second power voltage terminal to generate a phase information signal,
wherein a decreasing period of one of an output voltage to the output terminal and a voltage corresponding to the output voltage, and a turn-on time of the low-side switch are compared, and if the low-side switch is turned on before a decreasing of one of the output voltage and the voltage corresponding to the output voltage is completed, the dead time is controlled for the low-side switch to be turned on after the decreasing of one of the output voltage and the voltage corresponding to the output voltage is completed.

10. The switch driving circuit of claim 9, wherein an increasing period of one of the output voltage and the voltage corresponding to the output voltage and the turn-on time of the high-side switch are compared, and if the high-side switch is turned on before an increasing of the output voltage is completed, the dead time is controlled for the high-side switch to be turned on before the increasing of one of the output voltage and the voltage corresponding to the output voltage is completed.

11. The switch driving circuit of claim 10, further comprising:
an edge detector detecting an increasing edge and a decreasing edge of one of the output voltage and the voltage corresponding to the output voltage, and generating a first pulse signal having a pulse during a period corresponding to the increasing edge of one of the output voltage and the voltage corresponding to the output voltage and a second pulse signal having a pulse during a period corresponding to the decreasing edge,
wherein one of the low-side switch driver controlling signal and a signal corresponding thereto and the second pulse signal are compared, and if the turn-on time of the low-side switch advances the decreasing time of the second pulse signal, the dead time is controlled for the turn-on time of the low-side switch to be later than the decreasing time of the second pulse signal.

12. The switch driving circuit of claim 11, wherein one of the high-side switch driver controlling signal and a signal corresponding thereto and the first pulse signal are compared, and if the turn-on time of the high-side switch advances the decreasing time of the first pulse signal, the dead time is controlled for the turn-on time of the high-side switch to be later than the decreasing time of the first pulse signal.

13. The switch driving circuit of claim 12, further comprising:
a second state determiner receiving the low-side switch driver controlling signal, the high-side switch driver controlling signal, the first pulse, and the second pulse, and if the turn-on time of the high-side switch advances the decreasing time of the first pulse signal or the turn-on time of the low-side switch advances the decreasing time of the second pulse signal, generating a second quasi-zero voltage switching signal controlling a dead time controlling signal generator to increase the dead time.

14. The switch driving circuit of claim 13, further comprising:
the dead time controlling signal generator controlling an operation of the dead time controller according to the second quasi-zero voltage switching signal, wherein the dead time controlling signal generator generates the dead time controlling signal to increase the dead time according to the second quasi-zero voltage switching signal when the turn-on time of the high-side switch advances the decreasing time of the first pulse signal or when the turn-on time of the low-side switch advances the decreasing time of the second pulse signal.

15. The switch driving circuit of claim 14, wherein the dead time is increased if the dead time controlling signal is decreased, and the dead time controlling signal generator includes:
a capacitor;
a first switch connected to one terminal of the capacitor, and switch-operated according to the second quasi-zero voltage switching signal; and
a first sink current source connected to another terminal of the first switch and generating a sink current.

16. The switch driving circuit of claim 9, wherein one of the low-side switch driver controlling signal and a signal corresponding thereto and the phase information signal are compared, and if the turn-on time of the low-side switch is later than the phase change of the resonance current, the dead time is controlled for the turn-on time of the low-side switch to advance the phase change of the resonance current.

17. The switch driving circuit of claim 16, wherein the dead time is decreased if the turn-on time of the high-side switch and the turn-on time of the low-side switch are later than the phase change of the resonance current.

18. The switch driving circuit of claim 17, further comprising a dead time controlling signal generator that includes:
a capacitor;
a first source current source having one terminal supplied with a power voltage;
a first sink current source having one terminal that is grounded;
a first switch connected between one terminal of the capacitor and another terminal of the first source current source, and executing a switching operation according to a first quasi-zero voltage switching signal; and
a second switch connected between one terminal of the capacitor and another terminal of the first sink current source, and executing a switching operation according to the second quasi-zero voltage switching signal.

19. The switch driving circuit of claim 9, wherein the voltage corresponding to the output voltage operates a high-side switch driver generating a gate signal of the high-side switch.

20. A method for driving a switch driving circuit controlling a switching operation of a high-side switch connected between a first power voltage terminal and an output terminal, and a low-side switch connected between the output terminal and a second power voltage terminal, comprising:
detecting a phase of a resonance current flowing in the second power voltage terminal;
comparing a turn-on time of the high-side switch and a phase changing time of the resonance current;
controlling a dead time for the turn-on time of the high-side switch to advance a phase change of the resonance current if the turn-on time of the high-side switch is later than the phase changing time of the resonance current;
comparing a decreasing period of one of an output voltage output to the output terminal and a voltage corresponding to the output voltage, and the turn-on time of the low-side switch, and
wherein controlling the dead time includes controlling the dead time for the low-side switch to be turned on after a decreasing of one of the output voltage and the voltage corresponding to the output voltage is completed if the low-side switch is turned on before the decreasing of one of the output voltage and the voltage corresponding to the output voltage is completed as the comparison result.

21. A method for driving a switch driving circuit controlling a switching operation of a high-side switch connected between a first power voltage terminal and an output terminal, and a low-side switch connected between the output terminal and a second power voltage terminal, comprising:
detecting a phase of a resonance current flowing in the second power voltage terminal;
comparing a turn-on time of the high-side switch and a phase changing time of the resonance current;
controlling a dead time for the turn-on time of the high-side switch to advance a phase change of the resonance current if the turn-on time of the high-side switch is later than the phase changing time of the resonance current;
comparing an increasing period of one of an output voltage output to the output terminal and a voltage corresponding to the output voltage, and the turn-on time of the high-side switch, and
wherein controlling the dead time further comprises controlling the dead time for the high-side switch to be turned on after an increasing of one of the output voltage and the voltage of the voltage corresponding to the output voltage is completed if the high-side switch is turned on before the increasing of the output voltage is completed.

* * * * *